United States Patent

Toda

[19]

[11] Patent Number: 5,859,954

[45] Date of Patent: Jan. 12, 1999

[54] PRINTING APPARATUS, DATA REGISTRATION METHOD, AND STORAGE MEDIUM

[75] Inventor: Masanari Toda, Yokohama, Japan

[73] Assignee: Canon Kabushiki Kaisha, Tokyo, Japan

[21] Appl. No.: 684,971

[22] Filed: Jul. 19, 1996

[30] Foreign Application Priority Data

Jul. 27, 1995 [JP] Japan .................................. 7-211055
May 20, 1996 [JP] Japan .................................. 8-124625

[51] Int. Cl.$^6$ .................................................. G06K 15/00
[52] U.S. Cl. .......................................... 395/102; 395/117
[58] Field of Search ................................... 395/101, 112, 395/113, 114, 115, 116, 117; 358/426, 261.2, 445, 450, 467; 345/501, 520, 521, 523, 524, 525, 526

[56] References Cited

U.S. PATENT DOCUMENTS 5,216,754  6/1993  Sathi et al. ............................. 395/115

*Primary Examiner*—Arthur G. Evans
*Attorney, Agent, or Firm*—Fitzpatrick Cella Harper & Scinto

[57] ABSTRACT

A printer controller receives PDL data from a host computer, which is then analyzed by a PDL analysis program in the order received, and converted to an intermediate-language data, and stored in an intermediate-language-data buffer. When an overlay-registration start command is read, generated intermediate-language data is stored in a file system until an overlay-registeration end command is read. The levels of overlapping between one stored intermediate-language element and the other elements are calculated for each element. When overlapped, the size required to develop the overlapping elements together with the corresponding image data is calculated. The calculated size of the image data is compared with the total size of the original intermediate-language data. When the image data is smaller in size, the image data is developed and registered as intermediate-language data, thus reducing the total size of the intermediate-language data.

18 Claims, 11 Drawing Sheets

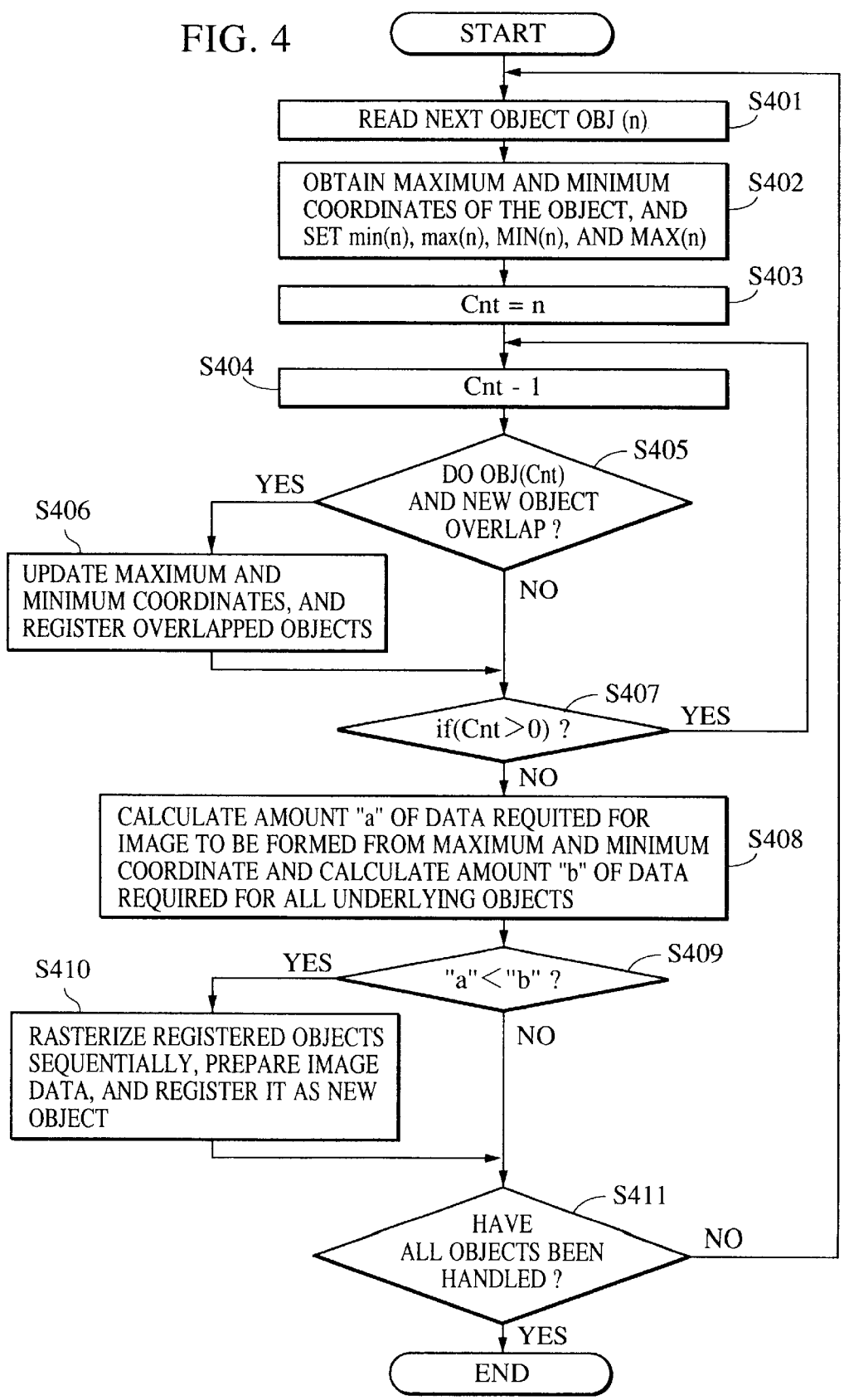

FIG. 5A
| Obj(n) | min(n) | max(n) | MIN(n) | MAX(n) | OVERLAPPED OBJECTS |
|---|---|---|---|---|---|
| 5021 |  |  |  |  | 5021 |
| 5022 |  |  |  |  | 5022  5021 |
| 5023 |  |  |  |  | 5023  5021 |
| 5024 |  |  |  |  | 5024  5023 |
| 5025 |  |  |  |  | 5025 |
| 5026 |  |  |  |  | 5026  5025  5021 |
FIG. 5B
| Obj(n) | min(n) | max(n) | MIN(n) | MAX(n) | OVERLAPPED OBJECTS |
|---|---|---|---|---|---|
| 5041 |  |  |  |  | 5041 |
| 5022 |  |  |  |  | 5022  5041 |
| 5023 |  |  |  |  | 5023  5041 |
| 5024 |  |  |  |  | 5024  5023 |
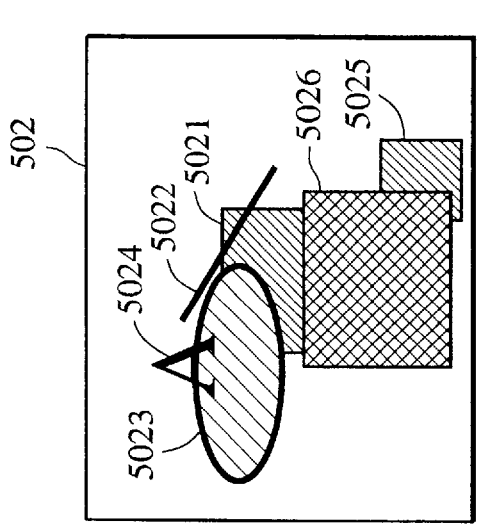
FIG. 5C
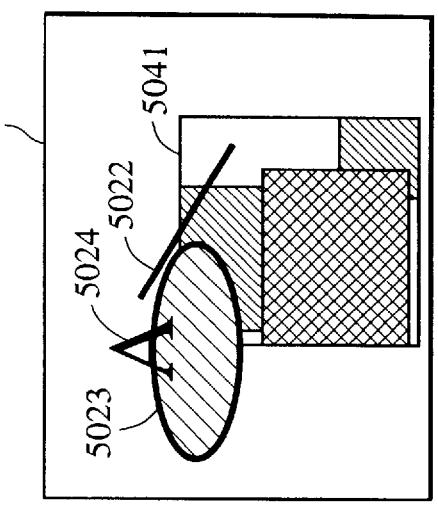
FIG. 5D

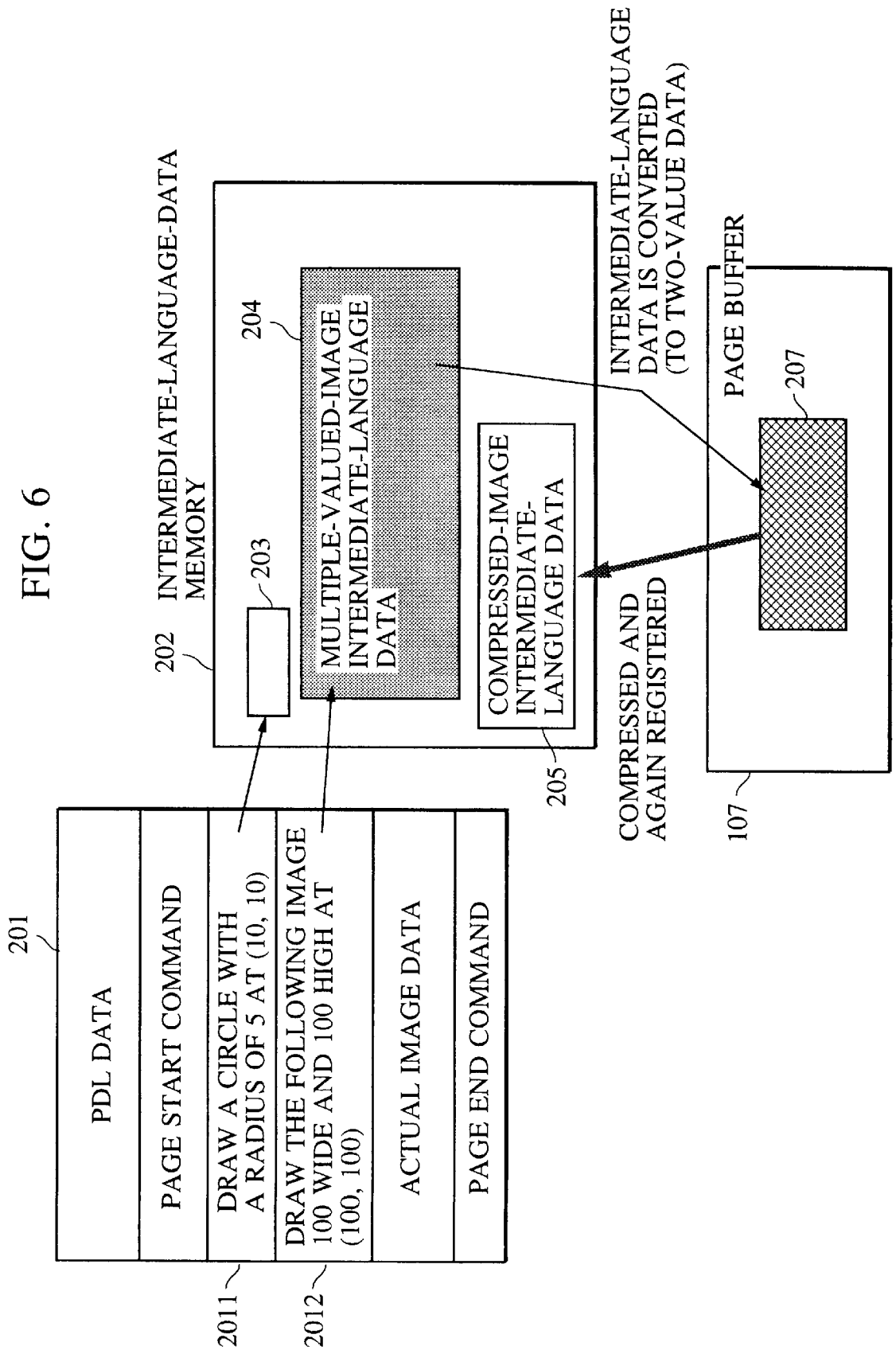

PRINTING APPARATUS, DATA REGISTRATION METHOD, AND STORAGE MEDIUM

BACKGROUND OF THE INVENTION

1. Field of the Invention

The present invention relates to printing apparatuses.

2. Description of the Related Art

Printers for printing and recording data at a high resolution are used for multimedia processing in fields such as computer aided design (CAD), computer graphics (CG), design and business desktop publishing (DTP) and are now commercially available.

Such a printer receives page-description-language (PDL) data sent from a host computer, analyzes it, creates the corresponding intermediate-language data, holds one page of that data, and renders (rasterizes) the held intermediate-language data at a high speed using hardware and/or software.

Intermediate-language data can be handled at high speed even if hardware is used. It includes a run-length object which has a set of the coordinates of the rightmost and leftmost points in the longitudinal direction in an object and an image object which includes image data as is.

Form overlay printing means that the same form data, such as a line and a logo, is repeatedly printed without frequently sending the data from the host computer, by storing the form data in a file system in the printer as intermediate-language data, and specifying the stored data when the form is drawn on a plurality of pages.

Form overlay printing can be implemented by three PDL commands, a form-registration start command, a form-registration end command and a form designation command. PDL data disposed between the form-registration start command and the form-registration end command is converted to the intermediate-language data, is assigned a unique name, and is registered in a file system of the printer as form data.

Intermediate-language data is created by manipulating PDL data such that the image data corresponding to the PDL data is readily created.

When a form designation command is detected in PDL data, the form data (intermediate-language data) having the specified name is copied to a memory space in which other intermediate-language data is stored, analyzed, converted to the image data and stored in a page buffer.

Since a form designation command can be called many times, a page having the same format can be repeatedly rendered (rasterized) by calling the command at different pages.

Some recently available printers receive PDL data sent from the host computer, analyze it, create the corresponding intermediate-language data, hold one page thereof, and perform rendering (rasterization) of the intermediate-language data at high speed by hardware or software with the alternate use of two band memory units when paper is discharged.

A simple intermediate language can be used at high speed even if hardware is used. It includes a run-length intermediate language which has a set of the coordinates of the rightmost and leftmost points in the longitudinal direction in an object, an image intermediate language which includes image data as is and a compressed image intermediate language which includes compressed images. Some image intermediate languages handle multiple-valued images having two, four, or eight bits per pixel, and draw images at the gray-scale levels of the printer according to positions where images are drawn.

Some intermediate languages create inverted black-and-white characters by applying a logical drawing method to the destination image already rendered (rasterized) on memory when intermediate-language data is rendered (rasterized).

Such a conventional printing apparatus has the following problems.

Since intermediate-language data is analyzed each time a form designation command is called, the data is analyzed at the same time rasterizing is performed, resulting in a long processing time. Although the size of intermediate-language data is generally smaller than that of the corresponding PDL data, the corresponding rendered (rasterized) data may be smaller when images are drawn at the same position.

Multiple-valued intermediate-language data is larger in size than two-valued-image intermediate-language data. When a plurality of intermediate-language data items are drawn at the same position, the size of an intermediate-language storage area needs to be very large.

When a number of intermediate-language data items are drawn in the same band, or there is a plurality of intermediate-language data items which require a long rasterization time, the development speed for intermediate-language data may be slower than the printer engine speed.

In the cases described above, degraded image data is created with lower resolution or a lower number of gray-scale levels, a memory area of one page for storing the image data is obtained, all intermediate-language data items are developed on that page, and paper discharge processing is performed. The output of the printer may become degraded depending on the data.

SUMMARY OF THE INVENTION

Accordingly, it is an object of the present invention to provide a printing apparatus which reduces the rendering time of registered form data (intermediate-language data) and also reduces the size of a memory area holding intermediate-language data.

The foregoing object is achieved according to one aspect of the present invention through the provision of a printing apparatus which generates the intermediate data from input data input from an information processing unit, generates the image data by rasterizing the intermediate data, and prints the image data, including, registration means for registering intermediate data; comparison means for comparing the size of the image data generated by rasterizing a plurality of intermediate data registered in the registration means with the size of the plurality of intermediate data; and control means for again registering the plurality of intermediate data by the corresponding image data according to comparison results from the comparison means.

The foregoing object is achieved according to another aspect of the present invention through the provision of a data registration method used for a printing apparatus which generates the intermediate data from input data from an information processing unit, generates the image data by rasterizing the intermediate data, and prints the image data, including the steps of, registering intermediate data; comparing the size of the image data generated by rasterizing a plurality of intermediate data registered in the registration means with the size of the plurality of intermediate data; and re-registering the plurality of intermediate data by the corresponding image data according to comparison results from the comparison means.

The foregoing object is achieved according to still another aspect of the present invention through the provision of a storage medium for storing a control program used for a printing apparatus which generates the intermediate data from input data input from an information processing unit, generates the image data by rasterizing the intermediate data, and prints the image data, the storage medium including, a registration module for registering intermediate data; a comparison module for comparing the size of the image data generated by rasterizing a plurality of intermediate data registered with the size of the plurality of intermediate data; and a control module for again registering the plurality of intermediate data by the corresponding image data according to comparison results.

The foregoing object is achieved according to yet another aspect of the present invention through the provision of a printing apparatus which generates the intermediate data from input data input from an information processing unit, generates the image data by rasterizing the intermediate data, and prints the image data, including, comparison means for comparing a rasterization time for intermediate data with a specified time; compression means for compressing the image data generated by rasterizing the intermediate data according to comparison results from the comparison means; and registration means for converting the image data compressed by the compression means to the intermediate data and registering the intermediate data.

The foregoing object is achieved according to a further aspect of the present invention through the provision of a data registration method used for a printing apparatus which generates the intermediate data from input data input from an information processing unit, generates the image data by rasterizing the intermediate data, and prints the image data, including the steps of, comparing the rasterization time for intermediate data with the specified time; compressing the image data generated by rasterizing the intermediate data according to comparison results in the comparing step; and registering the intermediate data converted from the image data compressed in the compressing step.

The foregoing object is achieved according to a still further aspect of the present invention through the provision of a storage medium which stores a control program used for a printing apparatus which generates the intermediate data from input data input from an information processing unit, generates the image data by rasterizing the intermediate data, and prints the image data, the storage medium including, a comparison module for comparing the rasterization time for intermediate data with the specified time; a compression module for compressing the image data generated by rasterizing the intermediate data according to comparison results from the comparison module; and a registration module for converting the image data compressed by the compression module to the intermediate data and registering the intermediate data.

BRIEF DESCRIPTION OF THE DRAWINGS

FIG. 4 is a flowchart of a control program used for updating in a first embodiment.

FIGS. 5A and 5B are views showing object registration tables.

FIGS. 5C and 5D are image frames representing objects in the registration tables of FIGS. 5A and 5B.

FIG. 6 is a view illustrating a case in which multiple-valued-image data is registered as intermediate-language data.

DETAILED DESCRIPTION OF THE PREFERRED EMBODIMENT

Figure 1:
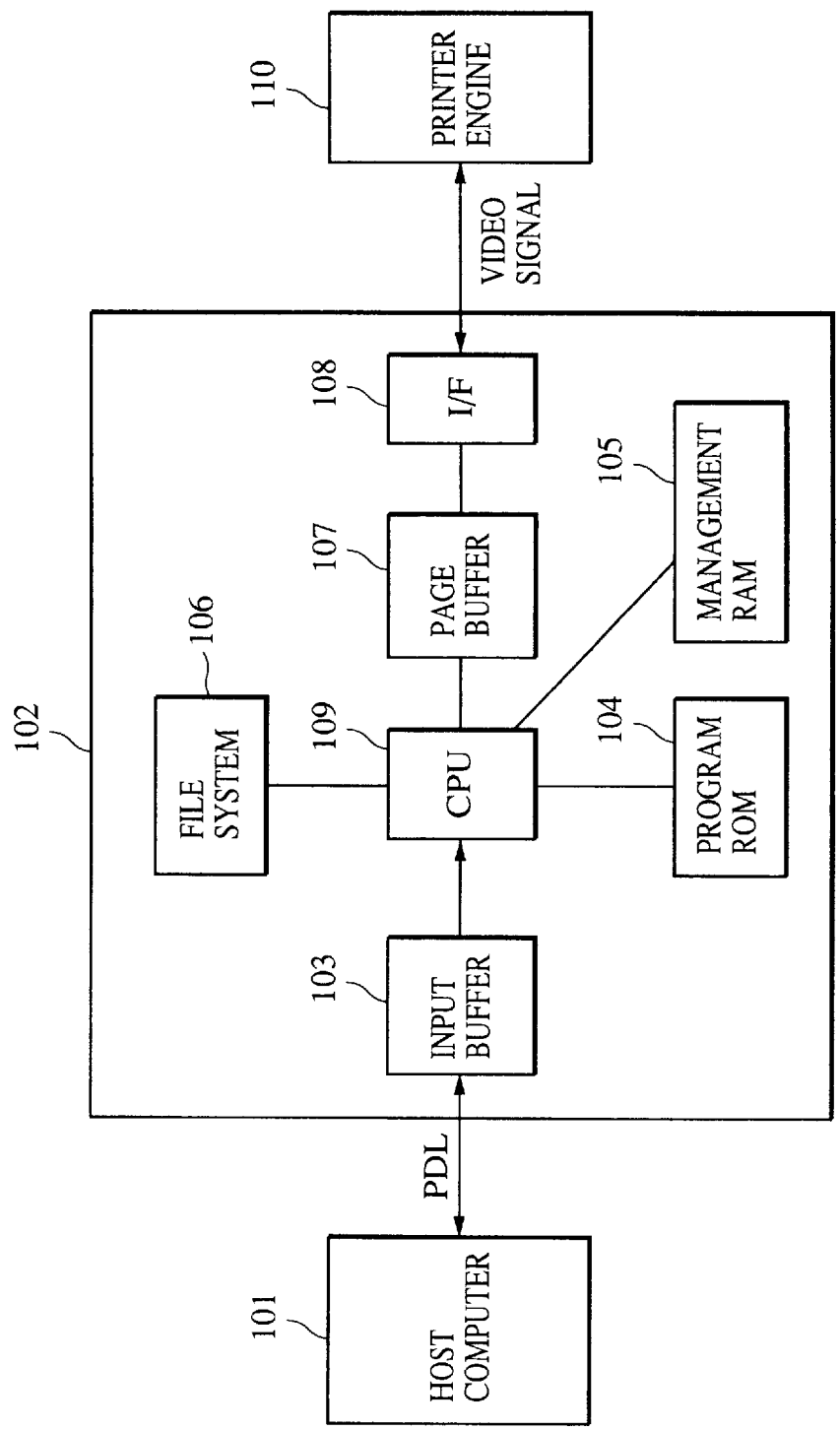
FIG. 1 is a block diagram of a printing control system according to an embodiment of the present invention.

A printing apparatus according to an embodiment of the present invention is described below. FIG. 1 is a block diagram showing a configuration of a printing apparatus according to the embodiment. In FIG. 1, a host computer 101 generates code data using drawing application software, converts the generated code data into data in a corresponding page description language (hereinafter called PDL), and sends the converted PDL data to a printer controller 102. PDL data is bi-directionally transferred between the host computer 101 and the printer controller 102.

The PDL data input into the printer controller 102 is temporarily stored in an input buffer 103 (RAM) and is processed by a PDL analysis program stored in a program ROM 104. The program ROM 104 stores processing procedures (control programs) described later and shown in FIGS. 4 and 10. A CPU 109 reads the PDL data according to a control program and executes various types of processing.

A management RAM 105 for the control program stores the intermediate-language data (page object) made by analyzing and converting the input PDL data, global information, and the like. A file system 106 is used for registering form data (intermediate-language data).

A page buffer 107 (RAM) stores the image data created by rasterizing the intermediate-language data. The page buffer 107 is required to have at least a two-band memory (page width by band height of about 256 or 512) for performing banding processing or, if the banding processing cannot be done, to have a memory of one page for storing degraded image data in a printing apparatus, such as a laser beam printer (LBP), which needs to transfer an image in synchronization with an engine.

Video information, that is, the contents of the page buffer 107, is transferred between a printer interface 108 and a printer engine 110, such as a LBP, in synchronization with the horizontal and vertical synchronizing signals of the printer. For a bubble-jet printer (BJ), video information conforming to the head control and the head size for a plurality of lines is transferred. The printer interface 108 also sends a command to the printer engine 110 and receives a status from the engine 110.

The CPU 109 is a calculation unit controlling the internal processing of the printer controller 102. The printer engine 110 prints in color a video signal sent from the printer controller 102. The printer engine 110 may be a color LBP using electrophotography or an ink-jet printer.

First embodiment

Figure 2:
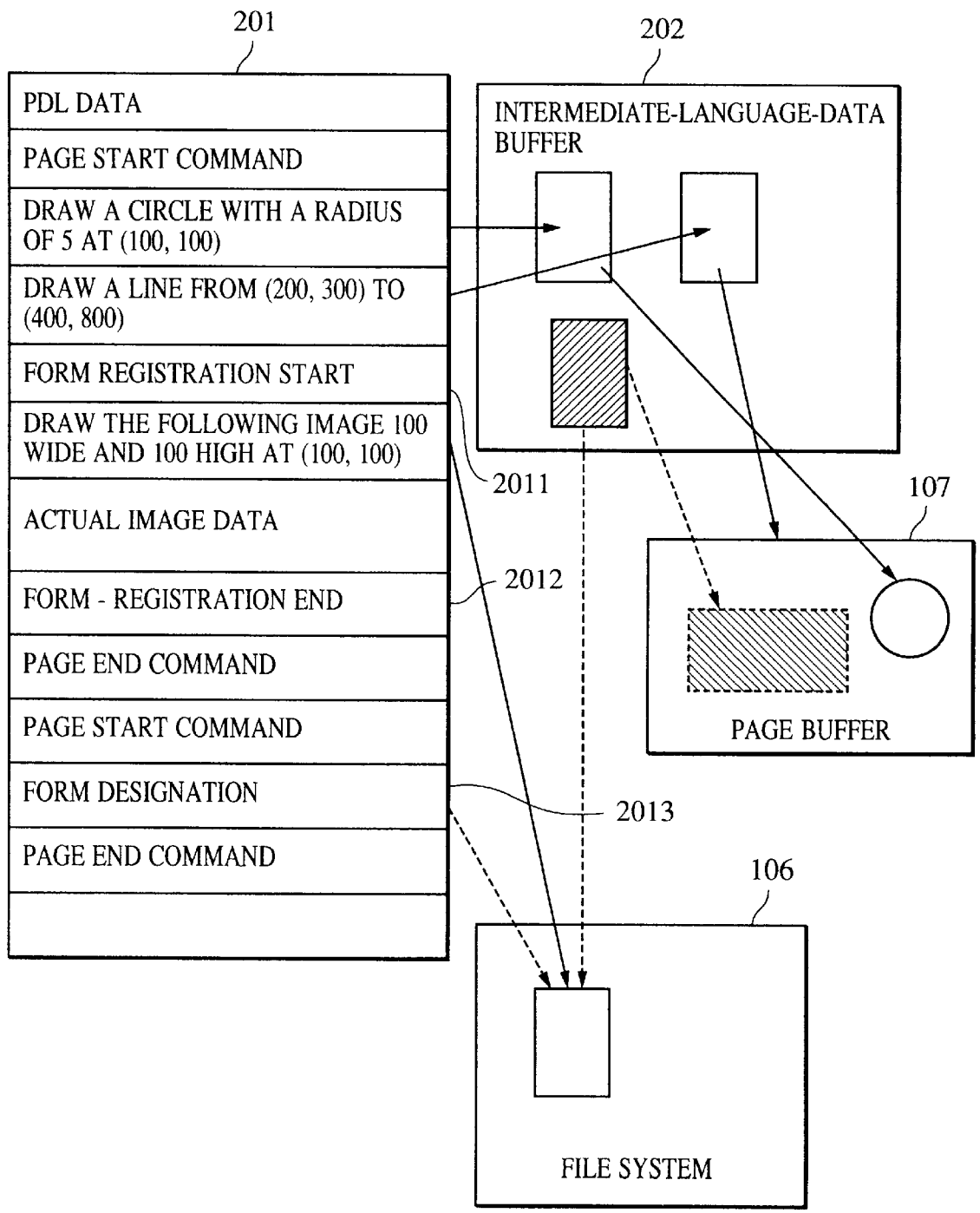
FIG. 2 illustrates a processing procedure performed by a printer controller 102 of FIG. 1 when PDL data is received.

FIG. 2 illustrates the processing flow which the printer controller 102 performs when it receives PDL data.

[Form registration]

In FIG. 2, there is shown PDL data 201. Figures and characters are sent from the host computer 101 together with positional information and symbols such as ASCII codes, and image data is sent together with positional information and the like. The PDL data is analyzed according to the PDL analysis program in the order the data is sent (namely from the top of the data shown in FIG. 2), is converted to the intermediate-language data and is stored in an intermediate-language-data buffer (memory space) 202. The intermediate-language-data buffer 202 is part of the RAM 105.

When a form-registration start command 2011 is read, the CPU 109 begins storing generated intermediate-language data into the file system 106 until a form-registration end command 2012 is read. When the form-registration end command 2012 is read, the CPU 109 makes groups of the intermediate-language data thus far stored in the file system 106 according to the levels of overlapping and the size of the entire data expected in the case when the data is calculated and rasterized in group units.

The CPU 109 determines a combination of intermediate-language data which requires the smallest size when rasterized, compared with the total size of the intermediate-language data, rasterizes the intermediate-language data in the group using the page buffer 107, and again registers as intermediate-language data in the file system 106. The intermediate-language data for which this processing is finished is deleted from the file system 106.

[Form designation]

When a form designation command 2013 in the PDL data is read, the CPU copies the designated form data from the file system 106 to the memory space 202, and the form data is first rasterized at the designated page in the page buffer 107.

[Data size prediction method for when overlay intermediate-language data is rasterized]

Figure 3A:
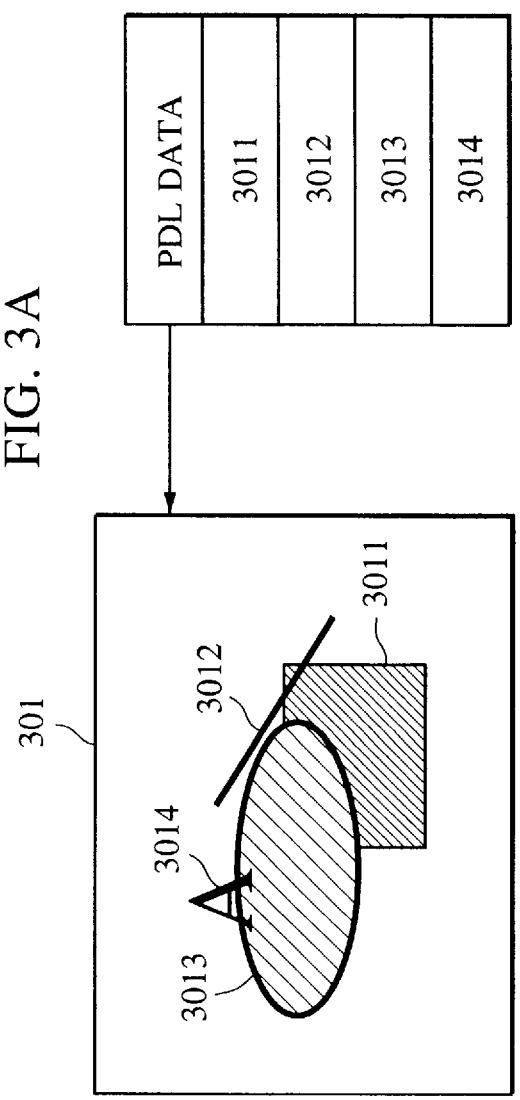
FIGS. 3A and 3B illustrate a prediction method for the size of the image (bit-map) data generated by rasterizing overlay intermediate-language data.
Figure 3B:
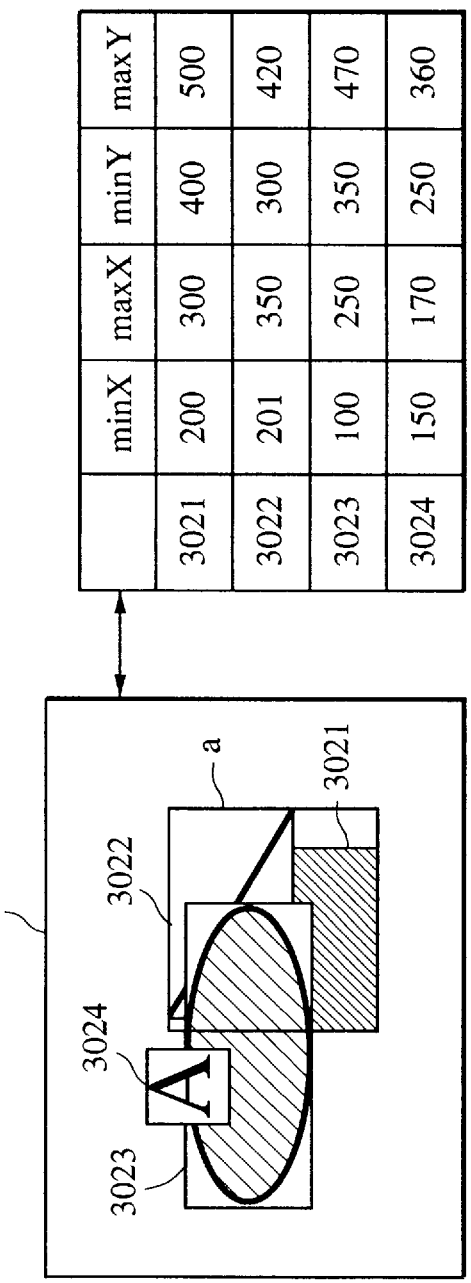

FIGS. 3A and 3B illustrate an image-data (bit map) size prediction method in a case when overlay intermediate-language data is rasterized. Screen 301 (FIG. 3A) is drawn with the use of the intermediate-language data in which data items 3011, 3012, 3013, and 3014 are registered in that order.

To find the level of overlapping in the case when each element is rasterized, the maximum and minimum X and Y coordinates of each element are calculated. Screen 302 (FIG. 3B) shows the calculation process. In Screen 302, since an intermediate-language data item 3021 is first drawn, the image-data size can easily be obtained from the maximum and minimum coordinates when the image data corresponding to the data item 3021 alone is formed.

To form the image data corresponding to the intermediate-language data item 3022, the intermediate-language data item 3021 needs to be drawn (rasterized) first, and then, on that image, the data item 3022 needs to be drawn. In other words, to form the image data corresponding to the intermediate-language data items 3021 and 3022 together, an area enclosed by a rectangle "a" needs to be converted to the image data. The level of overlapping in each element against other elements is calculated in this way. When elements are overlapped, the size of the image data to which the elements are converted together is calculated. The total size of the intermediate-language data items is compared with the calculated image-data size. When the calculated image-data size is smaller, the size of the entire intermediate-language data can be reduced by rasterizing the data items to form the image data and stores the image data as intermediate-language data items.

[Method for updating the maximum and minimum coordinates]

FIG. 4 is a flowchart of a control program used for updating the maximum and minimum coordinates. FIGS. 5A and 5B are views showing object registration tables. FIGS. 5C and 5D are image frames representing objects in the registration tables of FIGS. 5A and 5B. Using the object registration tables shown in FIGS. 5A and 5B, it is determined whether each element is converted to image data. Described first is a method for calculating the minimum and maximum coordinates used for the calculation of the size of image data when an object is converted to the image. The object registration tables shown in FIGS. 5A and 5B are stored in the management RAM 105.

The CPU 109 starts reading a new object (intermediate-language data) in step 401. The minimum coordinates (X, Y) and the maximum coordinates (X, Y) of the object to be added are calculated, and min(n)=(minX, minY) at column 5011 in an object registration table 501, max(n)=(maxX, maxY) at column 5012, MIN(n)=(MIN_X, MIN_Y) at column 5013, and MAX(n)=(MAX_X, MAX_Y) at column 5014, the last two of which are required when the object is converted to the image data, are set in step 402.

A counter Cnt is set to the current number of objects in step 403, and the counter Cnt is decremented by one in step 404. Whether the object OBJ(Cnt) and the new object overlap is checked by comparing MIN(n), MAX(n), min(Cnt), and max(Cnt) in step 405.

When they overlap, MIN(n) is set to the smallest value among MIN(n), MAX(n), min(Cnt), and max(Cnt), and MAX(n) is set to the largest value among them in step 406, and all overlapped objects are registered in column 5015.

It is determined whether data has already been registered in step 407. When there is no registered data, size "a" required for converting to an image from MIN(n) and MAX(n), and the sum "b" of the sizes required for all underlying objects are calculated in step 408.

It is determined whether the amount "a" of data converted to the image is smaller than the size "b" of all objects in step 409. When the size "b" is larger, the image data having the size of MIN(n) and MAX(n) is created using the objects registered in column 5015, and it is registered at the portion where the most lower object is disposed, in step 410 (see 5041 in FIG. 5B). When processing is finished for a certain object, the object is deleted from the object registration table 501.

Whether all objects have been processed is determined in step 411. If not, step 401 to step 411 are repeated until all objects are processed.

When objects 5021 to 5026 (FIG. 5A) are drawn on the page buffer 107 as shown in a frame 502 (FIG. 5C), the object registration table 501 is prepared. Objects 5021 to 5025 are registered as is as intermediate-language data since the sum of the amount of data required for each of them is smaller than that required when some of them are registered as a unit. When it is determined in a calculation for registering the image object of 5026 that it is better to register object 5026 together with 5025 and 5021, they are again registered as shown in FIG. 5A as the image data having the size shown by an object 5041 in a frame 504 (FIG. 5D).

Processing for rasterizing intermediate-language data in advance may be applied to normal mode in addition to form overlay printing. It may be configured that intermediate-language data is registered as is in form overlay, and re-calculation is performed at an idling time after registration to register to the smallest object again.

Second embodiment

A second embodiment of the present invention will be described by referring to FIGS. 6 to 10.

A case in which image data is smaller in size than the corresponding intermediate-language data will be described below by referring to FIG. 6. There is shown PDL data 201 sent to an input buffer 103 (FIG. 1). In PDL data, figures and characters are transferred together with positional information and symbols such as ASCII codes. Image data is transferred together with positional information and the like. The PDL data is analyzed by a PDL analysis program in the order in which it is transferred (from the top in the figure), is converted to intermediate-language data, and is usually stored in an intermediate-language-data memory space 202 (management RAM 105 of FIG. 1).

In normal mode, when a circle drawing command (2011) is read, the intermediate-language data 203 corresponding to a circle is stored in the intermediate-language memory 202.

An image drawing command 2012 is read next and handled, and the corresponding image intermediate-language data 204 is stored in the memory 202. When the multiple-valued-image intermediate-language data 204 is output to a two-valued-data printer, the converted image data for drawing is a two-valued image, and the size is smaller when a two-value conversion is used. Therefore, in this case, the CPU 109 uses a page buffer 107 for band rendering to convert the multiple-valued-image intermediate-language data to a two-valued image 207.

By storing this image as two-valued-image intermediate-language data, intermediate-language data which is smaller than the original data is created.

The data may be stored as compressed image intermediate-language data with the use of loss-less compression or lossy compression such as simple thinning out.

When the intermediate-language data is registered again, the CPU 109 deletes the original, that is, the multiple-valued image intermediate-language data, from the intermediate-language-data memory 202.

A case in which converted plural intermediate-language data items overlap at the same position will be described by referring to FIG. 7.

Figure 7:
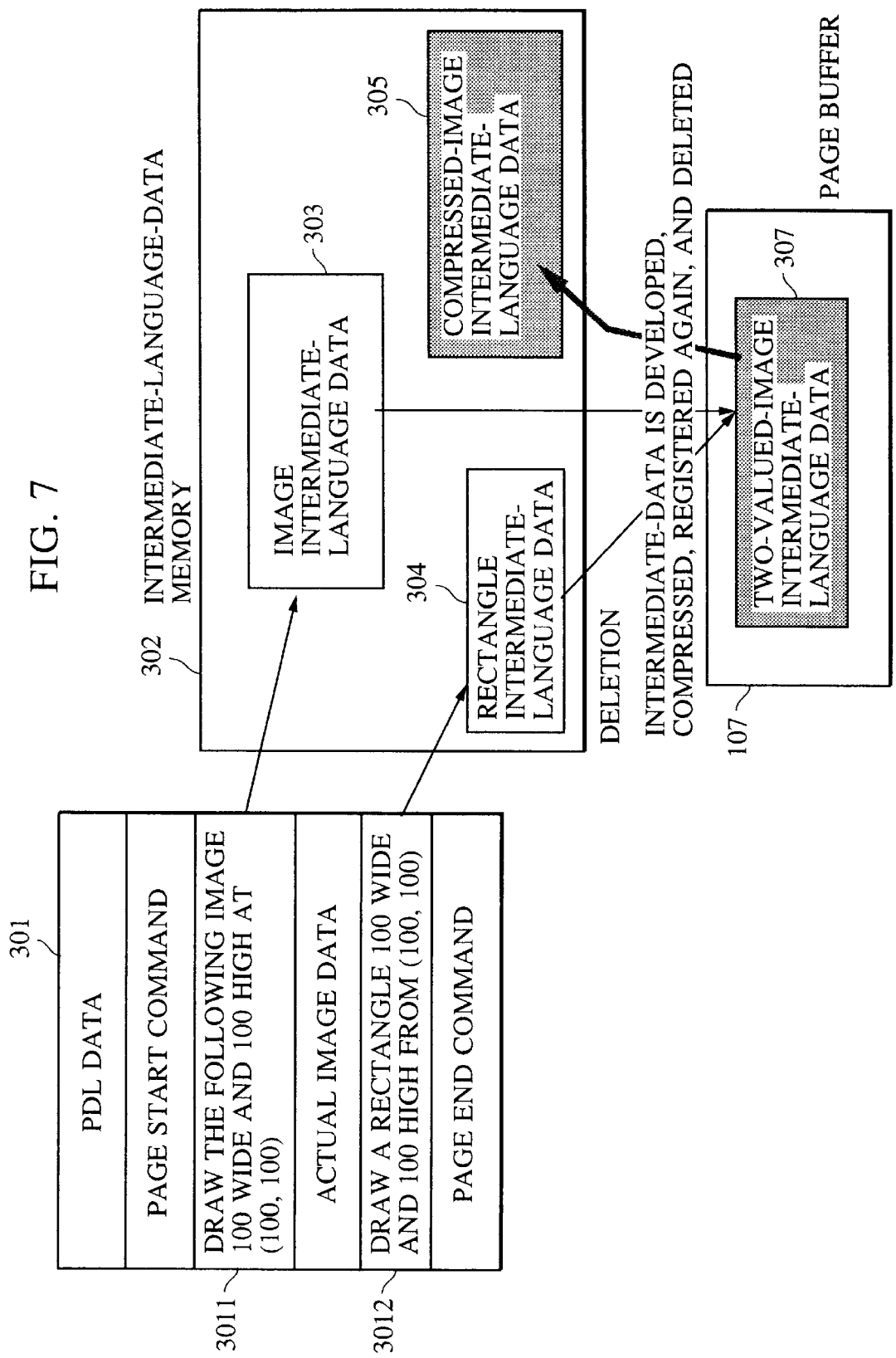
FIG. 7 is a view illustrating a case in which a plurality of intermediate-language data rasterized is overlapped.

There is shown PDL data 301 sent to the input buffer 103 in FIG. 7. In PDL data, figures and characters are transferred together with positional information and symbols such as ASCII codes. Image data is transferred together with positional information and the like. The PDL data is analyzed by a PDL analysis program in the order in which it is transferred, is converted to intermediate-language data, and is usually stored in an intermediate-language-data memory space 302 (management RAM 105).

In normal mode, when an image drawing command (3011) is read, the image intermediate-language data 303 is stored in the intermediate-language memory 302.

The CPU 109 reads a rectangle drawing command 3012, handles it, and stores the intermediate-language data 304 of the rectangle in the memory 302. When the image intermediate-language data 303 and the rectangle intermediate-language data are drawn at the same position with the same size, the total size of these two intermediate-language data items may be larger than the memory size required to draw these data items. In this case (a case in which one of overlapping intermediate-language data items is image data as described above), the image intermediate-language data and the rectangle intermediate-language data are developed with their relative coordinates being matched as one two-valued image 307 with the use of the page buffer 107 which is used in band rendering. By storing this image as two-valued image intermediate-language data, a intermediate-language data having a smaller size than that of the original is made.

The data may be stored as compressed image intermediate-language data with the use of loss-less compression or lossy compression such as simple thinning out.

When the intermediate-language data is registered again, the CPU 109 deletes the original, that is, the multiple-valued image intermediate-language data, from the intermediate-language-data memory 302.

Figure 8:
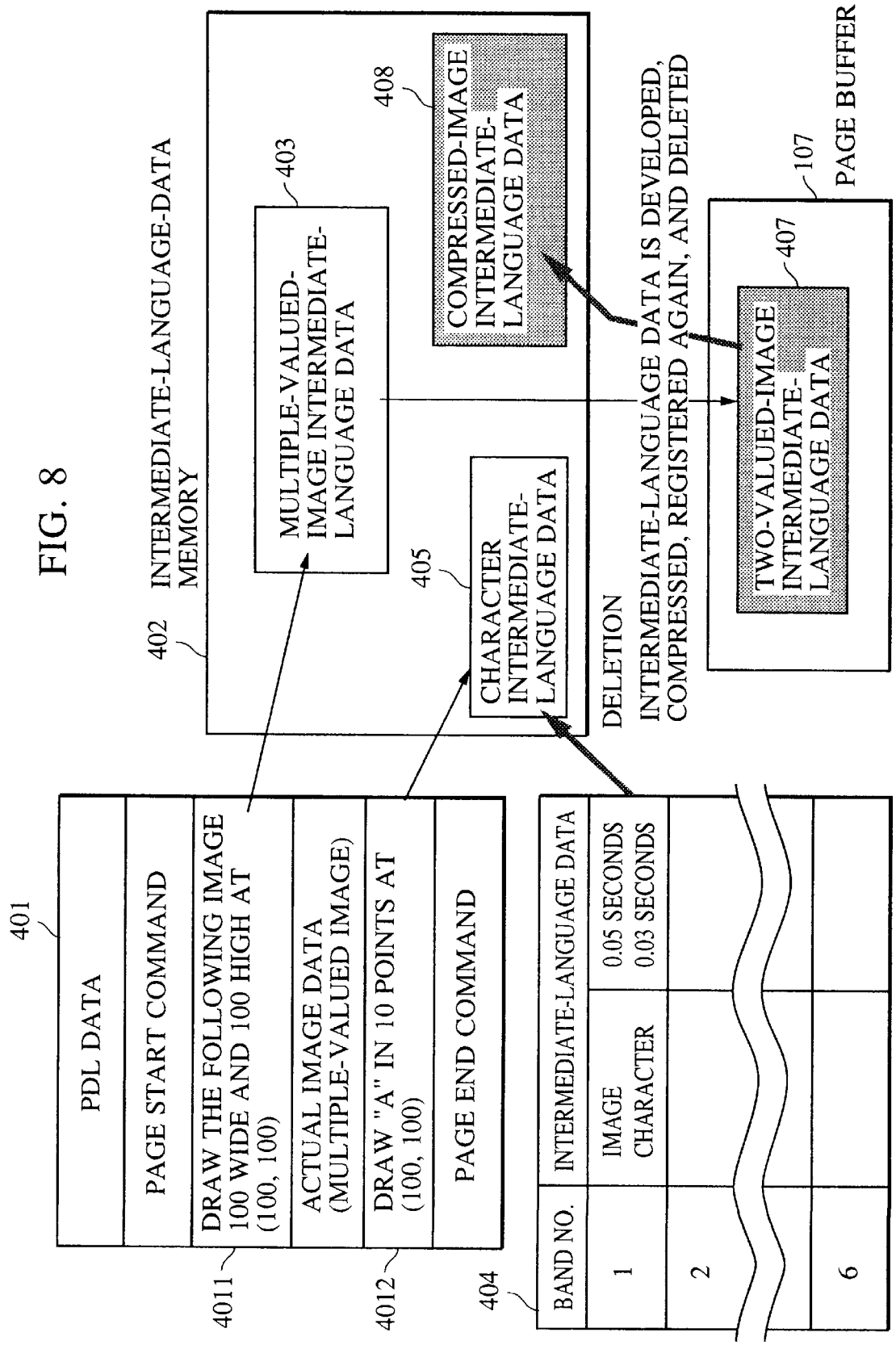
FIG. 8 is a view illustrating a case in which the rasterization time required for intermediate-language data is longer than the paper discharging time.

A case in which the rasterization time for intermediate-language data is longer than the paper discharging time will be described by referring to FIG. 8.

There is shown PDL data 401 sent to the input buffer 103 in FIG. 1. In PDL data, figures and characters are transferred together with positional information and symbols such as ASCII codes. Image data is transferred together with positional information and the like. The PDL data is analyzed by a PDL analysis program in the order in which it is transferred, is converted to intermediate-language data, and is usually stored in an intermediate-language-data memory space 402 (management RAM 105). The time required for rasterizing the intermediate-language data is predicted and calculated for each band (a part of one-page memory) and is stored in a table 404 disposed in the management RAM 105.

When a multiple-valued-image drawing command 4011 in the PDL data 401 is read after a page start command, the corresponding image intermediate-language data 403 is stored in the intermediate-language-data memory 402. The CPU 109 predicts the time required for rasterizing to the image for each band at the same time and stores the value in the drawing-time prediction table 404.

A character drawing command 4012 is next read, and the intermediate-language data 404 for the character is stored in the intermediate-language memory 402. Assuming that it is determined that the total drawing time is longer than paper discharging time because the character and the image corresponding to the data 403 are drawn in the same band, multiple-valued-image intermediate-language data, which requires the longest drawing time, is developed to a two-valued image with the use of the page buffer 107, and the image is registered as image intermediate-language data 407.

The data may be registered as compressed image intermediate-language data with the use of loss-less compression or lossy compression such as simple thinning out.

When the intermediate-language data is registered again, the multiple-valued-image intermediate-language data 403, which is the source data, is deleted from the intermediate-language memory 402, and the image drawing time in the drawing-time prediction table is changed to the prediction time required for drawing the two-valued image.

The overlay mode will be described next by referring to FIG. 9.

Figure 9:
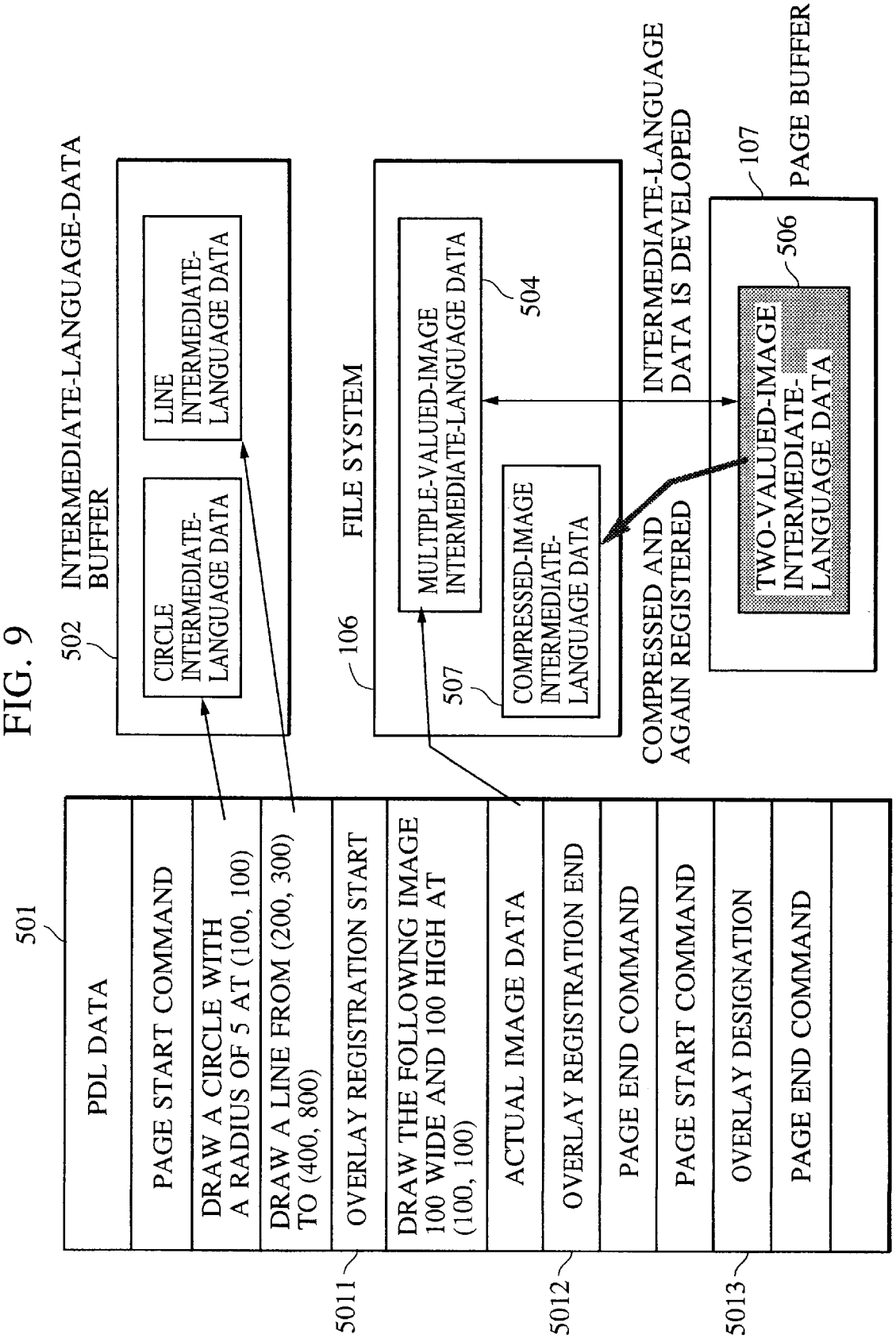
FIG. 9 is a view illustrating an overlay-mode case.

There is shown PDL data 501 sent to the input buffer 103 in FIG. 9. In PDL data, figures and characters are transferred together with positional information and symbols such as ASCII codes. Image data is transferred together with positional information and the like. The PDL data is analyzed by a PDL analysis program in the order in which it is transferred, is converted to intermediate-language data, and is usually stored in an intermediate-language-data memory space 502 (management RAM 105).

In such a page printer, form overlay printing means that the same form data, such as a line and a logo, is repeatedly printed without frequently sending the data from the host computer 1, by storing the form data in the file system 106 in the printer as intermediate-language data, and specifying the stored data when the form is drawn on a plurality of pages. When a form-registration start command 5011 is read, generated intermediate-language data is stored in the file system 106 until a form-registration end command is read. Stored groups of intermediate-language data are registered with names. When intermediate-language data is specified by a form designation command 5013, it is read from the file system and the corresponding drawing processing is performed. When form data is registered as intermediate-language data in the system described above, the form data is developed to the two-valued-image intermediate-language data with the use of the page buffer 107, and is stored in the file system 106 as overlay intermediate-language data 507 in the following cases.

(1) When there is multiple-valued-image data, and rasterized intermediate-language data is smaller in size
(2) When a plurality of intermediate-language data items are overlapped in drawing
(3) When there is a band for which rasterization time is longer than paper discharging time The data may be stored as compressed image intermediate-language data with the use of loss-less compression or lossy compression such as simple thinning out.

When the intermediate-language data is registered again, the source intermediate-language data is deleted from the file system 106.

Figure 10:
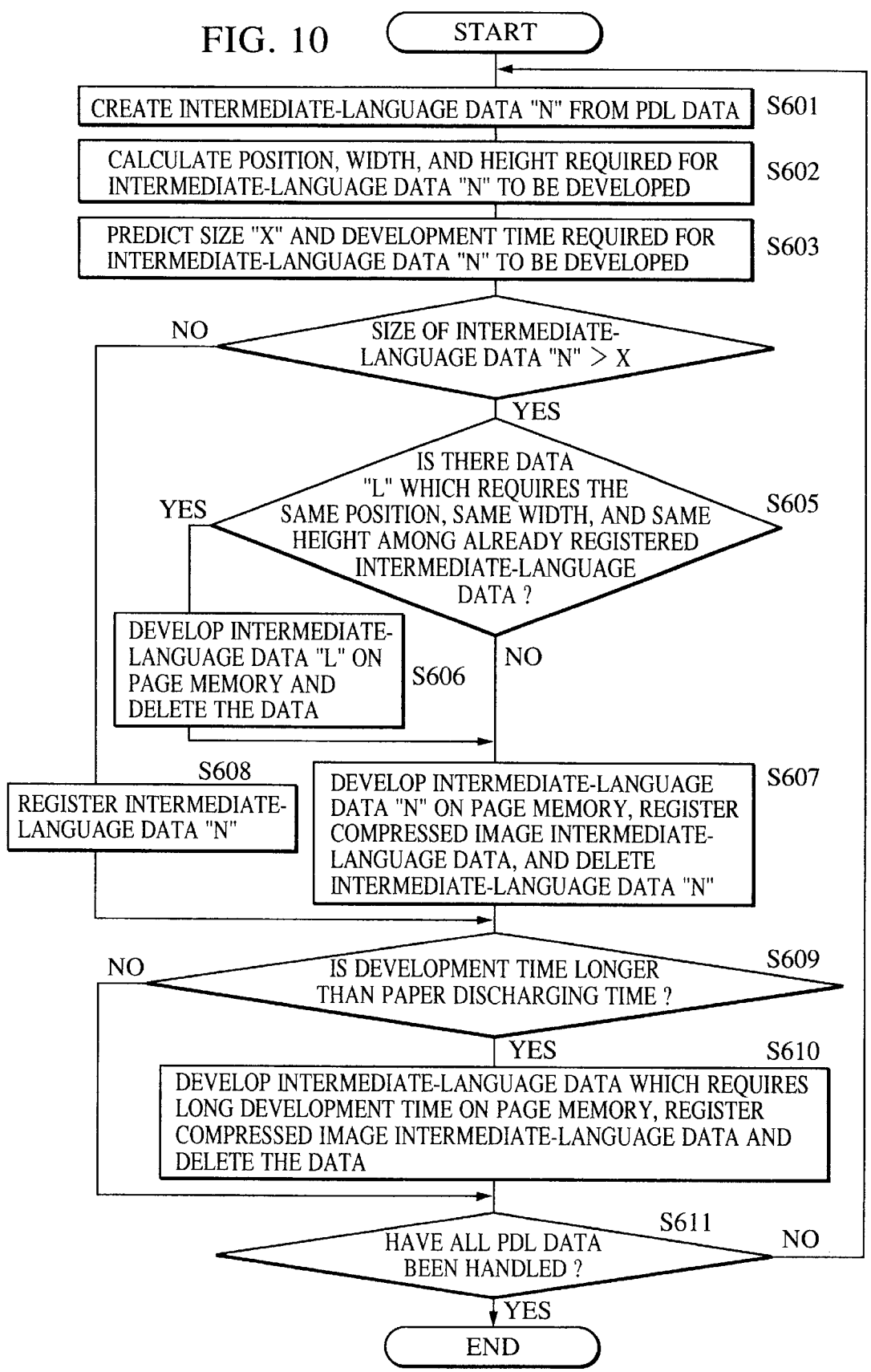
FIG. 10 is a flowchart of a control program used for updating in a second embodiment.

The processing described above will be noted below in one processing system with the use of a flowchart in FIG. 10 indicating the control program.

In step S601, PDL data is read from the input buffer 103 and the CPU 109 analyzes the data to generate the intermediate-language data N. The CPU 109 calculates the position, width, and height of the intermediate-language data N rasterized on a memory space (when the developed shape is not a rectangle, the minimum and the maximum values of the X coordinates and the Y coordinates are regarded as those of apexes of a rectangle in the calculation) in step S602. The memory size X required when the intermediate-language data N is rasterized is obtained from the width and height in step S603. When the size of the intermediate-language data N is larger than the size X required when the data is rasterized, in step S604, the CPU 109 executes step S605. Otherwise, the CPU executes S608. When there is intermediate-language data L which requires the same position, same width, and same height among already registered intermediate-language data in step s605, the CPU 109 executes step S606. Otherwise, the CPU 109 executes step S607. In step S606, the intermediate-language data L is rasterized on the page memory 107, and the data L is deleted. In step S607, the intermediate-language data N is rasterized on the page memory 107, compression processing is applied, and the compressed image intermediate-language data is registered. The intermediate-language data N is deleted. In step S608, the intermediate-language data N is registered as is. When intermediate-language rasterization time is longer than paper discharging time in step S609, the CPU 109 executes step S610. Otherwise, the CPU 109 executes step S611. In step S610, intermediate-language data which requires a long development time is rasterized in the page memory 107, and the intermediate-language data is deleted. The developed two-valued image is compressed and the compressed data is again registered as compressed intermediate-language data. In step S611, when the input buffer 103 has a PDL data item, the CPU executes step S601. Otherwise, the processing is terminated.

In the embodiment described above, intermediate-language data can be registered with a smaller data size in the normal mode or overlay mode. With the drawing time being reduced and the intermediate-language memory area being saved, a large number of data items can be stored in the same memory.

A storage media used for a printing apparatus according to this embodiment, such as the program ROM 104, will be described below by referring to FIGS. 11 and 12.

Figure 11:
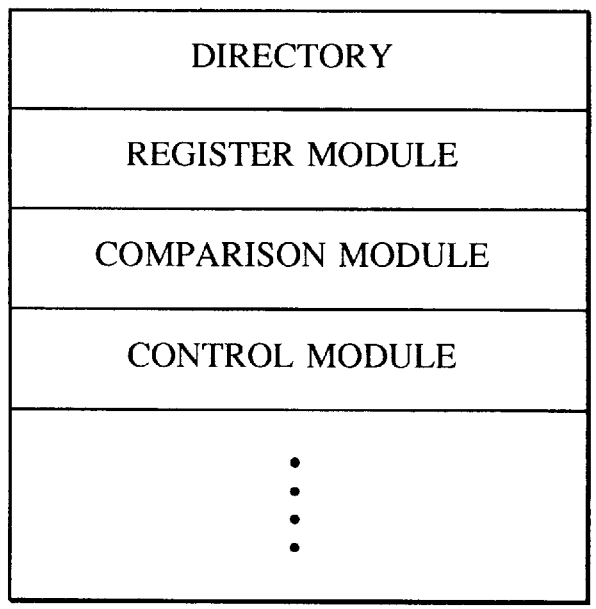
FIG. 11 is an example of a memory map of a storage medium which stores a control program.
Figure 12:
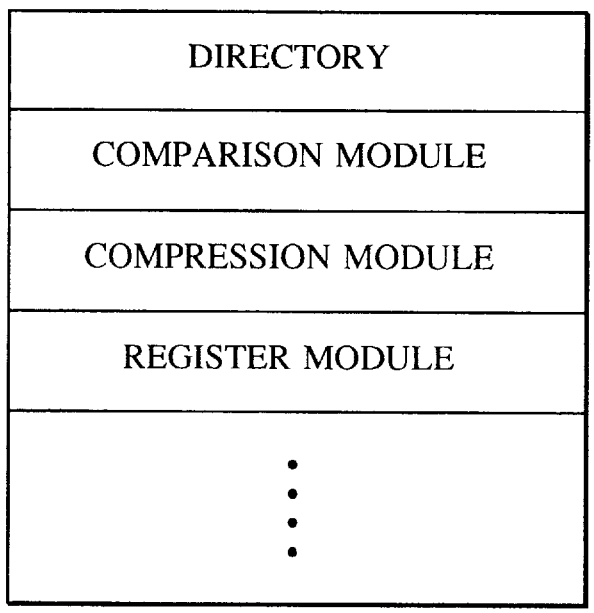
FIG. 12 is an example of a memory map of a storage medium which stores a control program.

FIGS. 11 and 12 show examples of memory maps of storage media which store control programs in embodiments of the present invention.

A storage medium which stores a control program that compares in size the image data generated by rasterizing a plurality of registered intermediate data with a plurality of the intermediate data, and registers the intermediate data again as image data according to the comparison results needs to have at least the program codes of a register module, comparison module, and control module as shown in FIG. 11.

The register module is used for registering intermediate data. The comparison module is used for comparing in size the image data generated by rasterizing a plurality of registered intermediate data with the plurality of intermediate data. The control module is used for registering intermediate data again as image data according to the comparison results.

A storage medium which stores a control program that compares the rasterization time for intermediate data with the specified time, compresses the image data generated by rasterizing the intermediate data according to the comparison results, converts the compressed image data into the intermediate data, and stores it needs to have at least the program codes of a comparison module, compression module and register module as shown in FIG. 12.

The comparison module is used for comparing the rasterization time for intermediate data with the specified time. The compression module is used for compressing the image data generated by rasterizing the intermediate data according to the comparison results. The register module is used for converting the image data compressed in the compression module into intermediate data and storing it.

As storage media, in addition to the ROM 104 used in this embodiment, a floppy disk, an optical disk, a magneto-optical disk, a CD-ROM disk, a CD-R disk, magnetic tape, and a non-volatile memory card, all of which are removable from the printing apparatus, may be used.

What is claimed is:

1. A printing control apparatus which performs overlay-printing based on form information and input data which are input from an information processing apparatus comprising:

analysis means fora generating intermediate data by analyzing form information input from said information processing apparatus;

registration means for registering intermediate data generated buy said analysis means in intermediate data memory;

rasterization means for generating image data by rasterizing intermediate data of said form information;

control means for controlling to registering the part of form information of one page in said intermediate memory as intermediate data, and controlling to register the rest of the form information in said intermediate data memory as the image data generated by said rasterization means based on the result of analysis by said analysis means; and output means for outputting said registered form information into an output memory on the basis of the form specifying information in input data input from said information processing apparatus, wherein said output means generates as image data by said rasterization means in case of registering the specified form information as intermediate data, and copies said image data in said output memory in case of registering said form information as image data.

2. An apparatus according to claim 1 further comprising:

compression means for compressing image data generated by said rasterization means, wherein said control means controls registering the image data compressed by said compression means in said intermediate memory.

3. An apparatus according to claim 1 further comprising:

comparison means for comparing a rasterization time, which is obtained by said analysis means, for rasterizing intermediate data to said form information with a specified time, wherein said control means controls to register intermediate data whose rasterization time is over the specified time as image data.

4. An apparatus according to claim 1 further comprising:

comparison means for comparing a data size, which is obtained by said analysis means, of intermediate data to said form information with a data size or rasterized image data, wherein said control means controls to register intermediate data whose rasterized data size is smaller than a size of intermediate data as image data.

5. An apparatus according to claim 1, wherein said output means outputs to overlay image data generated from said input data and image data generated from said form information.

6. An apparatus according to claim 1, wherein said form information is PDL.

7. A printing control method of performing overlay-printing based on form information and input data which are input from an information processing apparatus comprising:

an analysis step of generating intermediate data by analyzing form information input from said information processing apparatus;

a registration step of registering intermediate data generated by said analysis step in intermediate data memory;

a rasterization step of generating image data by rasterizing intermediate data of said form information;

a control step of controlling to registering the part of form information of one page in said intermediate memory as intermediate data, and controlling to register the rest of the form information in said intermediate data memory as the image data generated by said rasterization step based on the result of analysis by said analysis step; and an output step of outputting said registered form information into an output memory on the basis of the form specifying information in input data input from said information processing apparatus, wherein said output step generates as image data by said rasterization step in case of registering the specified form information as intermediate data, and copies said image data in said output memory in case of registering said form information as image data.

8. A method according to claim 7 further comprising:

a compression step of compressing image data generated by said rasterization step, wherein said control step controls registering the image data compressed by said compression step in said intermediate memory.

9. A method according to claim 7 further comprising:

a comparison step of comparing a rasterization time, which is obtained by said analysis step, for rasterizing intermediate data to said form information with a specified time, wherein said control step controls to register intermediate data whose rasterization time is over the specified time as image data.

10. A method according to claim 7 further comprising:

a comparison step of comparing a data size, which is obtained by said analysis step, of intermediate data to said form information with a data size of rasterized image data, wherein said control step controls to register intermediate data whose rasterized data size is smaller than a size of intermediate data as image data.

11. A method according to claim 7, wherein said output step outputs to overlay image data generated from said input data and image data generated from said form information.

12. A method according to claim 7, wherein said form information is PDL.

13. A storage medium storing a computer readable program for controlling a printing control apparatus which performs overlay-printing based on form information and input data which are input from an information processing apparatus, the program comprising:

an analysis step of generating intermediate data by analyzing form information input from said information processing apparatus;

a registration step of registering intermediate data generated buy said analysis step in intermediate data memory;

a rasterization step of generating image data by rasterizing intermediate data of said form information;

a control step of controlling to registering the part of form information of one page in said intermediate memory as intermediate data, and controlling to register the rest of the form information in said intermediate data memory as the image data generated by said rasterization step based on the result of analysis by said analysis step; and an output step outputting said registered form information into an output memory on the basis of the form specifying information in input data input from said information processing apparatus, wherein said output step generates as image data by said rasterization step in case of registering the specified form information as intermediate data, and copies said image data in said output memory in case of registering said form information as image data.

14. A storage medium according to claim 13 further comprising:

A compression step of compressing image data generated by said rasterization step, wherein said control step controls registering the image data compressed by said compression step in said intermediate memory.

15. A storage medium according to claim 13 further comprising:

A comparison step of comparing a rasterization time, which is obtained by said analysis step, for rasterizing intermediate data to said form information with a specified time, wherein said control step controls to register intermediate data whose rasterization time is over the specified time as image data.

16. A storage medium according to claim 13 further comprising:

A comparison step of comparing a data size, which is obtained by said analysis step, of intermediate data to said form information with a data size of rasterized image data, wherein said control step controls to register intermediate data whose rasterized data size is smaller than a size of intermediate data as image data.

17. A storage medium according to claim 13, wherein said output step outputs to overlay image data generated from said input data and image data generated from said form information.

18. A storage medium according to claim 7, wherein said form information is PDL.

* * * * *

UNITED STATES PATENT AND TRADEMARK OFFICE
CERTIFICATE OF CORRECTION

PATENT NO.: 5,859,954

DATED : January 12, 1999

INVENTOR(S) : MASANARI TODA

Page 1 of 3

It is certified that error appears in the above-identified patent and that said Letters Patent is hereby corrected as shown below:

ON TITLE PAGE
  [56] Attorney, Agent or Firm:
    "Fitzpatrick Cella Harper & Scinto" should read
    --Fitzpatrick, Cella, Harper & Scinto--.

IN THE DRAWINGS
  Sheet 4 of 11 "REQUITED" should read --REQUIRED--.

Column 9
  line 28, "cases." should read --cases:--;
  line 30, "size" should read --size;--;
  line 32, "drawing" should read --drawing; and--;
  line 34, "time" should read --time.--; and
  line 60, "s605," should read --S605,--.

COLUMN 10
  line 43, "it" should read --it,--;
  line 61, "fora" should read --for--; and
  line 66, "buy" should read --by--.

COLUMN 11
  line 19, "claim 1" should read --claim 1,--;
  line 25, "claim 1" should read --claim 1,--; and

UNITED STATES PATENT AND TRADEMARK OFFICE
CERTIFICATE OF CORRECTION

PATENT NO. : 5,859,954

DATED : January 12, 1999

INVENTOR(S) : MASANARI TODA

It is certified that error appears in the above-identified patent and that said Letters Patent is hereby corrected as shown below:

<u>COLUMN 11</u>
  line 34, "claim 1" should read --claim 1,--.

<u>COLUMN 12</u>
  line 8, "claim 7" should read --claim 7,--;
  line 14,"claim 7" should read --claim 7,--;
  line 23,"claim 7" should read --claim 7,--;
  line 45,"buy" should read --by--; and
  line 66,"claim 13" should read --claim 13,--.

UNITED STATES PATENT AND TRADEMARK OFFICE
CERTIFICATE OF CORRECTION

PATENT NO.  : 5,859,954

DATED       : January 12, 1999

INVENTOR(S) : MASNORI TODA

It is certified that error appears in the above-identified patent and that said Letters Patent is hereby corrected as shown below:

COLUMN 13
   line 6, "claim 13" should read --claim 13,--; and
   line 15,"claim 13" should read --claim 13,--.

Signed and Sealed this

Twenty-eighth Day of December, 1999

Attest:

Q. TODD DICKINSON

*Attesting Officer*  *Acting Commissioner of Patents and Trademarks*